United States Patent [19]

Katoh et al.

[11] Patent Number: 4,670,319

[45] Date of Patent: Jun. 2, 1987

[54] POLYESTER FILM FOR MAGNETIC RECORDING MEDIA

[75] Inventors: Hideo Katoh, Kanagawa; Kinji Hasegawa, Yokohama, both of Japan

[73] Assignee: Teijin Limited, Osaka, Japan

[21] Appl. No.: 868,048

[22] Filed: May 29, 1986

[30] Foreign Application Priority Data

May 29, 1985 [JP] Japan .................................. 60-114202

[51] Int. Cl.$^4$ ............................................... G11B 5/64
[52] U.S. Cl. ..................................... 428/141; 428/143; 428/323; 428/480; 428/694; 428/900; 428/910
[58] Field of Search ............... 428/141, 143, 323, 480, 428/614, 900, 910; 427/131

[56] References Cited

U.S. PATENT DOCUMENTS 4,505,966  3/1985  Adachi et al. ...................... 428/694
4,550,049  10/1985  Ono et al. ........................... 428/480
4,578,729  3/1986  Suzuki et al. ...................... 428/694

Primary Examiner—Paul J. Thibodeau

[57] ABSTRACT

A biaxially oriented polyester film for use in thin metallic film-type magnetic recording media, said polyester film having a first surface to which a thin metallic film as a magnetic recording layer is to be applied and a second surface coated with an easily slippable layer composed of an organic polymeric binder and inert fine solid particles dispersed therein, the first surface having (a) large protrusions with a diameter of 0.2 to 2 micrometers and a height of 20 to 200 angstrom distributed at a density of at least $10^3$ but less than $10^6$ per mm$^2$, and (b) small protrusions with a diameter of 0.01 to 0.1 micrometer and a height of 10 to 100 angstrom distributed at a density of from $10^6$ up to $10^9$.

9 Claims, No Drawings

POLYESTER FILM FOR MAGNETIC RECORDING MEDIA

This invention relates to a polyester film for thin metallic film-type magnetic recording media. More specifically, this invention relates to a biaxially oriented polyester film which has a smooth surface and excellent running characteristics and to the surface of which a magnetic recording layer in the form of a thin metallic film can be applied.

In recent years, ferromagnetic thin metallic film-type magnetic recording media formed by applying a ferromagnetic thin metallic film as a recording layer to a nonmagnetic support by a physical vapor deposition method such as vacuum evaporation plating or sputtering without using a binder have been proposed as high-density magnetic recording media. They include, for example, a Co vapor-deposited tape (Japanese Laid-Open Patent Publication No. 147010/1979) and a perpendicularly magnetized film composed of a Co-Cr alloy (Japanese Laid-Open Patent Publication No. 134706/1977). Thin metallic films formed by such film-forming means as vapor deposition, sputtering or ion plating have a thickness of as small as not more than 1.5 micrometers and yet have equivalent properties to conventional coated magnetic recording media having a magnetic recording layer thickness of at least 3 micrometers (obtained by mixing a magnetic powder with an organic polymeric binder and coating the mixture on a non-magnetic medium). There is a thought that the magnetic characteristics, such as coercivity Hc and squareness ratio, of a magnetic recording medium do not so much depend upon the surface condition of the nonmagnetic support. On the basis of this thought, U.S. Pat. No. 3,787,327 discloses a multilayer structure of Co-Cr formed by vacuum evaporation.

However, in magnetic recording media of the thin metallic film type, the thickness of the thin metallic film formed on the surface of a non-magnetic support is small and the surface condition (surface unevenness) of the non-magnetic support directly appears as the unevenness of the surface of the resulting magnetic recording layer and becomes a cause of noises.

From the viewpoint of noises, the surface of the non-magnetic support is preferably as smooth as possible. On the other hand, from the viewpoint of handling of the base film such as winding and unwinding, the smoothness of the film surface results in poor slipperness between films and therefore in the occurrence of a blocking phenomenon. Hence, the surface of a base film is required to be rough. The surface of a nonmagnetic support is therefore required to be smooth for good electromagnetic conversion characteristics and be rough for good handling properties. It is necessary to satisfy these incompatible properties at the same time.

Another important problem with the thin metallic film-type magnetic recording media in actual use is the travelling property of the surface of the thin metallic film. In a conventional coated magnetic recording media obtained by mixing a magnetic powder with an organic polymeric binder and coating the mixture on a base film, the travelling property of the magnetic surface can be improved by dispersing a slip agent in the binder. In the case of the thin metallic film-type magnetic recording medium, such a measure cannot be taken, and it is extremely difficult to maintain its running property stable. In particular, its travelling property at high temperatures and humiditites is inferior.

It is a primary object of this invention to provide a biaxially oriented polyester film which has a smooth surface and to the surface of which a thin metallic film having excellent running property as a magnetic recording layer can be applied.

Another object of this invention is to provide a process for producing such a polyester film.

Still another object of this invention is to provide a thin metallic film type magnetic recording medium formed by using the polyester film.

Other objects of this invention along with its advantages will become apparent from the following description.

According to this invention, there is provided a biaxially oriented polyester film for use in thin metallic film-type magnetic recording media, said polyester film having a first surface to which a thin metallic film as a magnetic recording layer is to be applied and a second surface coated with an easily slippable layer composed of an organic polymeric binder and inert fine solid particles dispersed therein, the first surface having (a) large protrusions with a diameter of 0.2 to 2 micrometers and a height of 20 to 200 angstrom distributed at a density of at least $10^3$ but less than $10^6$ per $mm^2$, and (b) small protrusions with a diameter of 0.01 to 0.1 micrometer and a height of 10 to 100 angstrom distributed at a density of from $10^6$ up to $10^9$ per $mm^2$.

The polyester forming the film of this invention includes linear saturated polyesters synthesized essentially from aromatic dibasic acids or ester-forming derivatives thereof and diols or ester-forming derivatives thereof. Specific examples of such polyesters are polyethylene terephthalate, polyethylene isophthalate, polybutylene terephthalate, poly(1,4-cyclohexylene dimethylene terephthalate), polyethylene-2,6-naphthalenedicarboxylate, copolymers of these, and blends of these with a minor proportion (preferably up to 5% by weight) of other miscible thermofusible resins (e.g., polyethylene and polypropylene). Of these, polyethylene terephthalate is especially suitable for use in this invention.

The polyethylene terephthalate, as referred to herein, is most preferably an ethylene terephthalate homopolymer, and also includes copolyethylene terephthalates composed of at least 85% of ethylene terephthalate units and the remainder being other units. There is no particular restriction on the other units, and they typically include tetramethylene terephthalate units, 1,4-cyclohexylene dimethylene terephthalate units, ethylene-2,6-naphthalenedicarboxylate units and ethylene p-hydroxybenzoate units.

The biaxially oriented polyester film is obtained generally by melt-extruding the polyester in a customary manner, biaxially stretching and heat-setting the stretched film. The biaxial stretching can be carried out, for example, by sequential stretching, simultaneous stretching, etc.

The polyester film is crystalline-oriented to such a degree that it has a heat of fusion, measured by a differential scanning calorimeter in a nitrogen stream at a temperature elevating rate of 10° C./min., of usually at least 4 cal/g. The thickness of the film after stretching is generally 3 to 100 micrometers, preferably 5 to 50 micrometers.

The main feature of the biaxially oriented polyester film of this invention is that (a) many large protrusions with a diameter of 0.2 to 2 micrometers and a height of 20 to 200 angstrom and (b) many small protrusions with a diameter of 0.01 to 0.1 micrometer and a height of 10 to 100 angstrom are distributed on the first surface to which a thin metallic film as a magnetic recording layer is to be applied. The densities of distribution of these large and small protrusions are also important. In the film of this invention, the density of distribution of the large protrusions (a) is at least $10^3$ but less than $10^6$ per mm$^2$ of the first surface, and the density of distribution of the small protrusions (b) is from $10^6$ to $10^9$ per mm$^2$ of the first surface. If the large and small protrusions on the first surface satisfy these conditions, noises in the resulting thin metallic film-type magnetic recording medium are drastically reduced, and the recording medium has a markedly superior noise level with excellent running properties of the thin metallic film surface. Preferably, the large protrusions (a) have a diameter of 0.5 to 2 micrometers, especially 0.5 to 1.5 micrometers and a height of 50 to 200 angstrom, especially 70 to 150 angstrom, and the density of distribution of the large protrusions is from $10^4$ to $10^5$ per mm$^2$ of the first surface. The small protrusions (b), on the other hand, preferably have a diameter of 0.05 to 0.1 micrometer and a height of 10 to 100 angstrom, especially 20 to 70 angstrom, and the density of distribution of the small protrusions is from $10^7$ to $10^8$ per mm$^2$ of the first surface.

In the present specification and the appended claims, the diameters, heights and distribution densities of the large and small protrusions on the first surface are measured by the following methods.

Diameter of the protrusions (i) In the case of the large protrusions, the film surface was photographed through a differential interference microscope (made by Nikon) at 400 X. The diameters of 20 protrusions were measured on the basis of the photograph, and an average value was calculated.

(ii) In the case of the small protrusions, the film surface was photographed through a scanning electron microscope at 45,000 X. The diameters of 20 protrusions were measured on the basis of the photograph, and an average value was calculated.

Height of the protrusions (i) In the case of the large protrusions, the distance from the peak to bottom of each protrusion was measured in a length of 0.5 mm by a high-precision needle contacting type surface roughness tester (TALYSTEF, a product of Taylor-Hobson Co.). The seventh largest distance was defined as the height of the protrusions. The measurement was made through 5 replicates, and the height was calculated as an average value.

(ii) In the case of the small protrusions, the height was measured by using a co-ordinate measuring scanning electron microscope (EMM-3000, a product of Elionix) at 80,000X in the planar direction and at a magnification in the height direction 10 to 30 times the magnification in the planar direction. Ten protrusions were measured, and an average value of heights was calculated.

Distribution density of the protrusions (i) In the case of the large protrusions, five photographs of the film surface were taken in the same way as the measurement (i) of the diameter of the protrusions described above. The number of protrusions was determined from the photographs, and their density of distribution was calculated per mm$^2$ of the film surface.

(ii) In the case of the small protrusions, five photographs of the film surface were taken in the same way as the measurement (ii) of the diameter of the protrusions described above. The number of protrusions was determined from the photographs, and their density of distribution was calculated per mm$^2$ of the film surface.

The "large protrusions" on the first surface of the polyester film of this invention can be formed by dispersing fine inert solid particle in the polyester before film formation.

There is no limitation on the inert solid fine particles to be included in the polyester, and they may be any solid fine particles which do not exert substantially deleterious effects on the physical and chemical properties of the polyester when dispersed in it. Examples of such inert solid fine particles which are preferably used in this invention include (1) silicon dioxide (including its hydrate, diatomaceous earth, silica sand and quartz); (2) alumina; (3) silicates containing at least 30% by weight of SiO$_2$ [for example, amorphous or crystalline clay minerals, aluminosilicates (including calcined products or hydrates), chrysotile, zirconium, flyash, etc.]; (4) oxides of metals such as Mg, Zn, Zr and Ti; (5) sulfates of Ca and Ba; (6) phosphates of Li, Na and Ca (including monohydrogen salts or dihydrogen salts); (7) benzoates of Li, Na and K; (8) terephthalates of Ca, Ba, Zn and Mn, (9) titanates of Mg, Ca, Ba, Zn, Cd, Pb, Sr, Mn, Fe, Co and Ni; (10) chromates of Ba and Pb; (11) carbon (such as carbon black and graphite); (12) glass (glass powder and glass beads); (13) carbonates of Ca and Mg; (14) fluorspar; (15) sulfides of Zn and Mo; and (16) powders of organic polymeric substances such as polytetrafluoroethylene and polyethylene. Examples of preferred inert solid fine particles include silicic anhydride, hydrous silicic acid, aluminum oxide, aluminum silicate (including its calcined product and hydrate), monolithium phosphate, trilithium phosphate, sodium phosphate, calcium phosphate, barium sulfates, titanium dioxide, lithium benzoate, double salts (containing hydrates) of these compounds, glass powder, clays (including kaolin, bentonite and terra alba), talc, diatomaceous earth and calcium carbonate. Silicon dioxide, titanium dioxide and calcium carbonate are especially preferred. The inert solid fine particles preferably have an average particle diameter of 0.05 to 0.5 micrometer, especially 0.05 to 0.1 micrometer. The inert solid fine particles should not contain too large particles, and any such large particles should be in a very small amount. Thus, the content of particles having a particle diameter of more than 1 micron is preferably not more than 5% by weight, especially not more than 2%, based on the weight of the entire particles.

The amount of the inert solid fine particles to be incorporated in the polyester is generally 0.005 to 1% by weight, preferably 0.005 to 0.5% by weight, especially preferably 0.01 to 0.3% by weight, based on the weight of the polyester.

The polyester having the inert solid fine particles dispersed therein can be produceed, for example, by adding the inert solid fine particles (preferably as a slurry in a glycol) to the reaction system during the reaction of forming the polyester, for example, at any desired time during ester-interchange reaction, polycondensation reaction or direct polymerization. Preferably, the inert fine solid particles are added to the reaction system in the early stage of the polycondensation reaction, for example before the intrinsic viscosity of the polyester reaches about 0.3. The inert fine solid particles may be an insoluble catalyst residue formed by the reaction of the ester interchange catalyst (a compound of a metal such as Ca, Mg or Mn) used in the production of the polyester with, for example, a phosphorus compound. Formation of such an inert catalyst residue can be effected by controlling the ratio of the amounts of the ester-interchange catalyst and the phosphorus compound and the polymerization conditions such as the temperature and time during the polymerization.

The resulting polyester containing the inert solid fine particles dispersed therein is molded in the molten state into a film by a method known per se and biaxially stretched. The stretching may also be carried out by a method known per se. The stretch ratio to be used at this time is selected so that the Young's modulus of the resulting biaxially stretched film in the longitudinal direction is within values desired of the resulting film. Generally, the film is stretched at a temperature of 70° to 150° C. to 3.4 to 5.5 times, preferably 3.5 to 5.5 times, in the longitudinal direction and to 3.0 to 5.8, preferably 3.2 to 4.2 times, in the transverse direction. The biaxially oriented film is usually heat-set at a temperature of 180° to 235° C., preferably 200° to 225° C.

The above stretching and heat-setting treatments give a polyester film having large protrusions distributed on the surface.

On the other hand, the "small protrusions" on the first surface of the polyester film may be formed by coating a coating composition composed of inorganic or organic inert solid fine particles and an organic polymeric binder on the first surface of a film stretched in at least one direction.

The material constituting the inert solid fine particles that can be included in the coating composition may be properly selected from those described hereinabove with regard to the inert solid fine particles incorporated in the polyester for the formation of the "large protrusions". Among them, silica, alumina, titanium oxide, kaolin and carbon black are preferred. Since the inert solid fine particles used to form the small protrusions substantially constitute the profiles of the small protrusions, they may have an average particle diameter of generally 0.01 to 0.1 micron, preferably 0.05 to 0.09 micrometer, more preferably 0.05 to 0.08 micrometer according to the small protrusions. Such inert solid fine particles should not contain too large particles in their particle size distribution, and the content of particles having a particle diameter of more than 0.3 micrometer should be at most 5% by weight based on the entire solid particles.

The coating composition may be organic solvent-based or aqueous. Particularly, it is preferably an aqueous coating composition. Hence, the organic polymeric binder used therein should desirably be water-soluble, water-swellable or water-dispersible.

The organic polymeric binder that can be used may, for example, be copolymerized polyethylene terephthalate, polyurethane, nylon, melamine, and a mixture of a metal acrylate and a film-forming polymeric substance. Of these binder components, the mixture of a metal acrylate as a crosslinking agent (e.g., aluminum acrylate) and a film-forming polymeric substance is preferred. The film-forming polymeric substance includes substantially linear water-soluble, water-swellable or water-dispersible polymeric substances. Examples of the water-soluble polymeric substances include polyvinyl alcohol, water-soluble melamine resin, water-soluble urea resin, polyacrylamide, polymethacrylamide, phenolic resins (such as resol resin), poly($C_2$-$C_4$)alkylene glycols (such as polyethylene glycol, polypropylene glycol, polytrimethylene glycol, polytetramethylene glycol, and polyethylene glycol/polypropylene glycol block copolymer), poly(sodium acrylate), poly(sodium methacrylate), starch, hydroxyalkyl celluloses (such as hydroxyethyl cellulose and hydroxypropyl cellulose), polyvinyl pyrrolidone, water-soluble alkyd resins, copolyesters containing a sodium sulfonate group hydroxyl group-containing polyacrylate esters (such as a copolymer of methyl acrylate and hydroxyethyl (meth)acrylate or hydroxypropyl (meth)acrylate), aliphatic mono or polyglycidyl ethers (such as ethylene glycol diglycidyl ether and diethylene glkycol diglycidyl ether), poly(sodium styrenesulfonate); and water-soluble silicone resins. Of these, polymeric substances having an aliphatic hydroxyl group are preferred. Examples of the water-swellable or water-dispersible polymeric substance include vinylidene chloride copolymers (such as a copolymer of vinylidene chloride and vinyl chloride, vinyl chloride copolymers (such as a copolymer of vinyl chloride and vinylidene chloride), ethyl acrylate copolymers (such as a copolymer of methyl acrylate and methyl methacrylate), vinyl acetate copolymers (such as a copolymer of vinyl acetate and ethylene), carboxyl group-containing copolyesters, sulfonic acid (salt) group containing copolyesters, maleic anhydride copolymers (for example, a copolymer of maleic anhydride and vinyl chloride or vinyl acetate), polyurethanes and epoxy resins.

Binder resins having high heat resistance are preferred. Examples are polyvinyl alcohol, water-soluble melamine resin, hydroxyalkyl celluloses, and polyurethane resins.

These water-soluble, water-swellable or water-dispersible polymeric substances may be those which are known. For monomers or monomeric mixtures which give such polymeric substances, and methods for their (co)polymerization, High Polymer, Vol. XXIX, "Polymerization Processes" (John Wiley & Sons), 1977 may be cited herein in lieu of a detailed description thereof.

The organic solvent-base or aqueous coating composition from inert solid fine particles and the organic polymeric binder may be prepared by methods known per se [see, for example, "Technology of Paints, Varnishes and Lacquers" (Reihold Book Corporation, 1968; "Emulsion and Water-Soluble Paints and Coatings" (Reinhold Publishing Corporation) 1964]. For example, the aqueous coating composition may be prepared by mixing an aqueous dispersion of a water-dispersible polymeric binder, an aqueous dispersion of the inert solid fine particles and a surface-active agent for improving the dispersibility of these ingredients. The coating composition may contain additives such as a crosslinking agent, a polymerization catalyst, a heat stabilizer or an ultraviolet absorber. The surface-active agent may, for example, be a nonionic surface-active agent such as polyoxyethylene nonyl phenyl ether.

The contents of the inert solid fine particles and the organic polymeric binder in the coating composition are not strictly limited, and may be changed depending upon the distribution density desired of the small protrusions on the first surface, the type of the binder, etc. Generally, the suitable amount of the inert solid fine particles is 5 to 50 parts by weight, preferably 10 to 40 parts by weight, more preferably 20 to 30 parts by weight, per 100 parts by weight of the organic polymeric binder used. The suitable amount of the organic polymeric binder is generally 0.5 to 30% by weight, especially 1 to 20% by weight, above all 2 to 10% by weight, based on the weight of the coating composition.

The coating of the coating composition on the first surface should be carried out to a relatively small thickness. The rate of coating as solids is generally 1 to less than 5 mg/m$^2$, preferably 1 to 2.5 mg/m$^2$. Coating of the coating composition may be carried out by means known per se, for example by roll coating, gravure coating, air knife coating, or dipping. Drying and/or curing of the coated film can be carried out usually at a temperature of 100° to 240° C. Advantageously, drying and/or curing is preferably carried out simultaneously with the heat-setting treatment in the process of producing the biaxially oriented film.

By properly controlling the content of the inert solid fine particles, the ratio of the solid fine particles and the binder, and the rate of coating of the coating composition in the coating composition, a film having small protrusions at a distribution density within the above-specified range can be formed on the first surface of the film on the basis of routine experiments.

The second surface of the polyester film is coated with an easily slippable layer composed of an organic polymeric binder containing inert solid fine particles dispersed therein as a slip agent. The coating composition used to form the easily slippable layer may be selected from the coating compositions described hereinabove with regard to the formation of the small protrusions on the first surface. The coating composition used to form the easily slippable layer on the second surface may be the same as, or different from, the coating composition used to form the small protrusions on the first surface.

Desirably, the easily slippable layer on the second surface has a more rough surface than the first surface. The surface roughness of the easily slippable layer on the scond surface is expressed by a center line average roughness Ra and a 10-point average roughness Rz. Conveniently, Ra is generally 0.002 to 0.01 micromeer, preferably 0.003 to 0.007 micrometer, and Rz is generally 0.02 to 0.1 micrometer, and preferably 0.03 to 0.07 micrometer.

On the other hand, the surface roughensss of the first surface having the large and small protrusions generally have an Ra of not more than 0.005 micrometer and an Rz of not more than 0.05 micrometer.

The center line average roughness Ra and the 10-point average roughness Rz herein may be determined by the following methods.

Center line average roughness Ra

By using a high-precision surface roughness tester SE-3FAT (made by Kosaka Kenkyusho Co., Ltd.), the surface roughness curve of a sample film is drawn on a chart under a load of 30 mg with a cutoff of 0.08 mm on an enlarged scale of 200,000X using a needle with a radius of 2 micrometers. A part having a measured length of L is picked up from the surface roughness curve in a direction along the center line of the curve. Let the center line of the picked-up part be X-axis and the longitudinal direction, Y-axis, the roughness curve is expressed by Y=f(x). The value Ra (in micrometers) given by the following equation is defined as the surface roughness of the film.

$$Ra = \frac{1}{L} \int_0^L |f(x)| \, dx$$

In the present invention, the measured length L is set at 1.25 mm, and the measurement is made through 4 replicates. Ra is obtained as an average of the four measured values.

10-Point average roughness Rz

In the roughness curve of the film surface drawn in the measurement of the center line average roughness Ra, five highest peaks (P) and five lowest valleys (V) are taken and summed up, and the sum is divided by 5. Specifically, Ra is given by the following equation.

$$Rz = \frac{1}{5}\left(\sum_{i=1}^{5} Pi + \sum_{i=1}^{5} Vi\right)$$

The easily slippable layer having a more rough surface than the first surface may be formed by monoaxially stretching the film, then coating the aforesaid coating composition on the surface of the stretched film, and then further stretching the coated film to form a surface with network-like fine protrusions.

Preferably, the amount of the coating composition coated as solids is adjusted to at least 5 mg/m$^2$, especially 5 to 200 mg/m$^2$, above all 20 to 100 mg/m$^2$. By increasing the amount of coating in this manner, a network-like surface can be formed although no clear reason for its formation has yet been elucidated. On the other hand, since the amount of coating on the first surface is small, a network-like surface does not form even if the formulation of the coating composition is the same as that on the second surface, and a surface with small protrusions can be formed. Coating of the second surface can be carried out by the same method of coating the coating composition on the first surface. The treatment of the coated layer may be the same as that described with regard to the first surface.

As a result, there can be formed on the second surface of the film an easily slippable layer with a surface having network-like fine protrusions which has the surface roughnesses Ra and Rz defined above and a protrusion height (measured in the same way as in the measurement of the heights of the large and small protrusions) of generally 200 to 600 angstrom, preferably 300 to 500 angstrom.

The biaxially oriented polyester film of this invention so formed conveniently has a Young's modulus in the longitudinal direction of preferably at least 550 kg/mm$^2$, more preferably at least 600 kg/mm$^2$, and especially preferably at least 650 kg/mm$^2$, and a heat shrinkage at 150° C. in the transverse direction of 1 to 5%, preferably 2 to 5%, more preferably 2 to 4%.

The "Young's modulus in the longitudinal direction" and "heat shrinkage in the transverse direction" are measured in accordance with the following methods.

Young's modulus

The film was cut into a sample piece having a width of 10 mm and a length of 150 mm. With a chuck distance of 100mm, the sample was stretched by an Instron universal tensile tester at a stretch speed of 10 mm/min. and a chart speed of 500 mm/min. The Young's modulus is calculated from a tangent to the rising part of the resulting load-elongation curve.

Heat shrinkage

The sample film is allowed to shrink freely in a hot air circulating-type oven (Geer's aging tester) at 150° C., and the heat shrinakge of the film is calculated in accordance with the following formula.

$$\text{Heat shrinkage} = \frac{\text{Original length} - \text{Length after shrinkage}}{\text{Original length}} \times 100 \,(\%)$$

The original length of the film is 300 mm.

The biaxially oriented polyester film having the particular large and small protrusions on the first surface and the easily slippable layer on the second surface which is provided by this invention is smooth at the first surface and permits the formation of a thin metallic film having excellent travelling property on the first surface. It is suitable for use as a base film for thin metallic film-bearing magnetic recording media. The use of the film of this invention makes it possible to produce thin metallic film-bearing magnetic recording media having drastically reduced noises, a very superior noise level and excellent travelling property at the thin metallic film surface.

A thin metallic film-type magnetic recording medium may be produced by using the polyester film of this invention by methods known per se (such as the methods described in Japanese Laid-Open Patent Publications Nos. 134706/1977 and 147010/1979). Specifically, vacuum deposition, ion plating and sputtering techniques can be preferably used.

In the case of vacuum deposition, a metal to be deposited is evaporated in a tungsten boat or an alumina hearth under a vacuum of $10^{-4}$ to $10^{-6}$ torr by resistance heating, high frequency heating, electron beam heating, etc. and deposited on the polyester film as a support. Fe, Ni, Co and alloys of these may usually be used as the metal to be deposited.

A reactive vapor deposition method may also be applied to this invention in which Fe is evaporated in an $O_2$ atmosphere to obtain a thin film of iron oxide.

According to the ion plating method, a DC glow discharge or RF glow discharge is generated in an atmosphere consisting mainly of an inert gas under $10^{-4}$ to $10^{-3}$ torr, and a metal is evaporated in the discharge. Ar is usually used as the inert gas.

According to the sputtering method, a glow discharge is generated in an atmosphrre composed mainly of Ar under $10^{-3}$ to $10^{-1}$, and atoms on the surface of a target are sputtered. Glow discharge may be generated by a dc-diode or dc-triode sputtering method and a high frequency sputtering method. A magnetron sputtering method utilizing magnetron discharge may also be used.

The thickness of a thin magnetic film in accordance with this invention may be that which provides a signal output sufficient as a high-density magnetic recording medium. Accordingly, the thin magnetic film preferably has a thickness of generally 0.02 to 1.5 micrometers (200 to 15,000 angstrom) although varying depending upon the method of forming the thin film and the use of the final product.

For forming thin magnetic films for longitudinal recording as, for example, in audio and video devices and computers, vapor depositing methods (such as heat vapor deposition, or electron beam vapor deposition) and sputtering method (such as dc-diode sputtering or high frequency sputtering) may be employed. In the case of vapor deposition, a ferromagnetic metal such as Co is continuously deposited obliquely and repeatedly layered on a nonmagnetic polyester film so that the axis of easy magnetization appears horizontally of the film. The suitable tota thickness of the thin metallic film is about 0.002 to 0.5 micrometer (200 to 5,000 angstrom). In addition to the longitudinal recording method for audio and video devices and computers, there can also be applied a perpendicular magnetic recording method which permits high-density digital recording for PCM and flexible discs and in which a mixture of a suitable amount (10 to 20%) of Cr with Co is used to suppress the generation of a demagnetized field and develop an easy axis of magnetization in the perpendicular direction of a nonmagnetic polyester support and thereby perform recording in the perpendicular direction of the surface of the support.

Usually, a Co-Cr alloy having a thickness of 0.2 to 1.5 micrometers is used. It is possible at this time to dispose a thin film of magnetic fluxes composed of a material having a high permeability such as Permalloy (Fe-Ni) or Supermalloy between the nonmagnetic support and a magnetic recording layer having an easy axis of magnetization in the perpendicular direction. The thin film of the magnetic fluxes is formed by sputtering and has a thickness of 0.1 to 1 micrometer (1,000 to 10,000 angstrom) with a low coercivity of not more than 50 Oe. The suitable thickness of the Co-Cr film of the magnetic recording layer is adjusted to about 0.2 to 1.5 micrometers (2,000 to 15,000 angstrom).

The following examples illustrate the present invention more specifically. The various properties described in these examples were measured by the following methods.

1. Average particle diameter of the inert solid fine particles

A centrifugal particle size analyzer (Model CP-50 made by Shimazu Seisakusho Co., Ltd.) was used. From a cumulative curve of particle sizes and the amounts of particles with these particle sizes present which were calculated on the basis of the resulting centrifugal sedimentation curve, the particle size which corresponded to 50 mass percent was read, and defined as the average particle diameter of the inert solid fine particles. (See "Particle Size Measuring Technique", pages 242–247, 1975 published by Nikkan Kogyo Press.)

2. Electromagnetic conversion characteristics (recording density characteristics)

High-density recording characteristics, particularly the magnitude of the noise level, were evaluated by the S/N ratio (dB) at the time of recording and playback of 10 KBPI and the decrease of the output at the time of recording and playback of 50 KBPI from that at the time of recording and playback of 10 KBPI.

3. Coefficient of dynamic friction ($\mu k$)

The metal surface of a thin metal film-type tape was contacted at an angle $\theta$ of $(152/180)\pi$ radian (152°) with a SUS 27 fixed rod (surface roughness 0.3S; outside diameter 20 mm) at a temperature of 25° C. and a relative humidity of 60% and moved at a speed of 25 cm/sec in frictional contact. The coefficient of dynamic friction ($\mu k$) was calculated from the outlet tension $T_2$ in grams when the tension controller is regulated so as to provide an inlet tension $T_1$ of 30 g. In the present invention, the coefficient of dynamic friction obtained when the tape travelled 30 m is defined as $\mu k$.

$$\mu k = \frac{2.303}{\theta} \log \frac{T_2}{T_1} = 0.868 \log \frac{T_2}{T_1}$$

At this time, $\theta = 152°$ $(=(152/180)\pi$ radian) was used.

EXAMPLES 1-3 AND COMPARATIVE EXAMPLES 1-3

Zinc acetate (0.023 part by weight; 0.020 mole % based on dimethyl terephthalate) as a catalyst was added to 100 parts by weight of dimethyl terephthalate and 70 parts by weight of ethylene glycol, and the mixture was subjected to ester-interchange reaction at 150° to 240° C. for 4 hours while distilling off methanol. Then, 0.014 part by weight, calculated as trimethyl phosphate, of a stabilizer (a glycol solution of a phosphorus compound) was added, and 0.04 part by weight of antimony trioxide as a polycondensation catalyst was added. Furthermore, the inert solid fine particles indicated in Table 1 were added, and the polycondensation was carried out under a high vacuum of less than 1 mmHg to give polyethylene terephthalate having an intrinsic viscosity, measured in o-chlorophenol at 25° C., of 0.65.

The resulting polyethyene terephthalate was met-extruded and quenched in a customary manner to form an unstretched film having a thickness of 210 micrometers. The unstretched film was then stretched in the longitudinal direction to 3.5 times at 90° C. and then in the transverse direction to 4.0 times at 100° C., and then heat-set at 205° C. for 30 seconds to form a biaxially oriented film having a thickness of 15 micrometers.

In Examples 1 to 3 and Comparative Examples 1 and 2, a coating composition having the following formulation was coated on the surfaces (A) (first surface) and (B) (second surface) of the monoaxially stretched film before the transverse stretching.

Formulation of the coating composition (parts by weight)

| | |
|---|---|
| Aluminum acrylate (P-3 ® made by Asada Chemical Co., Ltd.; 2 wt. % solution) | 12 |
| Polyethylened glycol (made by Nippon Oils and Fats Co., Ltd.; molecular weight 19,000; 2 wt. %) | 5 |
| Polyethylene glycol diglycidyl ether (NEROIO ® made by Nagase Sankyo K. K.; 2 wt. % solution) | 2 |
| Polyoxyethylene nonyl phenyl ether (2 wt. % solution) | 1 |
| Aqueous dispersion of colloidal silica (2 wt. % aqueous dispersion of colloidal silica having an average particle diameter of 70 to 80 micrometers) | 8.5 |

The amount of the coating composition coated was about 2.2 g/m² in the wet state, and about 0.0126 g/m² as solids.

The protrusions on the film surface (A) were controlled by varying the amount of coating as shown in Table 1 by regulating the speed of the pickup roll.

The slipperiness of the resulting biaxially oriented film was good with no occurrence of blocking, and the film could be wound up in good condition.

The characteristics of the film surfaces (A) and (B) are summarized in Table 1.

A thin film of a cobalt-nickel alloy was formed in a thickness of 1,000 angstrom by vacuum deposition on the surface (A) of the polyester film. The film was then slit in the machine direction of the film to a width of ¼" to form a thin metallic film-bearing magnetic recording tape. Signals were recorded and played back at a speed of 9.5 cm/sec on the resulting tape using a ring head with a gap length of 0.3 micrometer, and the electromagnetic conversion characteristics (digital recording density characteristics) of the tape wer evaluated. The results are shown in Table 1.

The abrasion resistance of the tape was evaluated on the following standards by the degree of scratch on the magnetic recording layer of the tape using the coefficient of dynamic friction $\mu k$ after 50 repeated running cycles.

Good: Scratch was scarcely observed
Poor: Marked scratch was observed

The results show that the S/N of the magnetic recording medium of this invention is high and its noise level is outstandingly superior. It was also seen that in Examples 1 to 3 the tapes showed good running property and the abrasion resistance of the thin metallic film was good.

TABLE 1

| | | | Example 1 | Example 2 | Example 2 |
|---|---|---|---|---|---|
| Inert solid particles | Type | | Kaolin | Silica | Silica |
| | Average particle diameter (micrometers) | | 0.1 | 0.05 | 0.08 |
| | Content of particles having a particle size of at least 1 micrometers (%) | | 2 | 1 | 1.5 |
| | Amount added (wt. %) | | 0.05 | 0.05 | 0.01 |
| Amount of coating on surface (B) as solids (mg/m²) | | | 12.6 | 12.6 | 12.6 |
| Amount of coating on surface (A) as solids (mg/m²) | | | 1.5 | 2.0 | 2.5 |
| Young's modulus in the longitudial direction (kg/mm²) | | | 550 | 560 | 555 |
| Heat shrinkage in the transverse direction (%), 150° C. 30 min. | | | 3.5 | 3.6 | 3.5 |
| Film surface (A) | Large protrusions | Diameter (micrometers) | 0.7 | 1.0 | 0.7 |
| | | Height (angstrom) | 100 | 180 | 50 |
| | | Density (per mm²) | $2 \times 10^4$ | $5 \times 10^4$ | $6 \times 10^4$ |
| | Small protrusions | Diameter (micrometers) | 0.08 | 0.07 | 0.08 |
| | | Height (angstrom) | 50 | 100 | 100 |
| | | Density (per mm²) | $3 \times 10^7$ | $5 \times 10^7$ | $7 \times 10^7$ |
| Film surface (B) | Ra (micrometers) | | 0.006 | 0.007 | 0.008 |
| | Rz (micrometers) | | 0.055 | 0.067 | 0.075 |
| Height of protrusions on film surface (B) (angstrom) | | | 170 | 150 | 150 |
| Magnetic tape properties | S/N (db) 10KBPI | | 47 | 43 | 41 |
| | Output (10KBPI)/Output (50KBPI) | | 4 | 6 | 6 |
| | $\mu k$ | | 0.06 | 0.08 | 0.10 |
| | Abrasion resistance | | Good | Good | Good |

| | | | Comparative Example 1 | Comparative Example 2 | Comparative Example 3 |
|---|---|---|---|---|---|
| Inert solid particles | Type | | Kaolin | Clay | Calcium carbonate |
| | Average particle diam- | | 0.3 | 0.5 | 0.5 |

TABLE 1-continued

|  |  |  |  |  |
|---|---|---|---|---|
| eter (micrometers) |  |  |  |  |
| Content of particles having a particle size of at least 1 micrometers (%) |  | 7 | 7 | 10 |
| Amount added (wt. %) |  | 0.1 | 0.1 | 0.5 |
| Amount of coating on surface (B) as solids (mg/m$^2$) |  | 12.6 | 12.6 | — |
| Amount of coating on surface (A) as solids (mg/m$^2$) |  | 1.0 | 10.0 | 5.0 |
| Young's modulus in the longitudial direction (kg/mm$^2$) |  | 550 | 555 | 560 |
| Heat shrinkage in the transverse direction (%), 150° C. 30 min. |  | 3.5 | 3.4 | 3.5 |
| Film surface (A) | Large protrusions | Diameter (micrometers) | 2.5 | 2.3 | 3.0 |
|  |  | Height (angstrom) | 250 | 300 | 270 |
|  |  | Density (per mm$^2$) | $5 \times 10^2$ | $7 \times 10^2$ | $6 \times 10^2$ |
|  | Small protrusions | Diameter (micrometers) | 0.07 | 0.25 | 0.15 |
|  |  | Height (angstrom) | 20 | 150 | 130 |
|  |  | Density (per mm$^2$) | $5 \times 10^5$ | $2 \times 10^9$ | $1 \times 10^9$ |
| Film surface (B) | Ra (micrometers) |  | 0.009 | 0.006 | 0.005 |
|  | Rz (micrometers) |  | 0.082 | 0.052 | 0.044 |
| Height of protrusions on film surface (B) (angstrom) |  |  | 170 | 150 | 150 |
| Magnetic tape properties | S/N (db) 10KBPI |  | 37 | 28 | 23 |
|  | Output (10KBPI)/Output (50KBPI) |  | 12 | 18 | 20 |
|  | μk |  | 0.12 | 0.12 | 0.50 |
|  | Abrasion resistance |  | Poor | Poor | Poor |

EXAMPLES 4-6

The procedure of Examples 1 to 3 was repeated except that a coating composition prepared as below was used to coat the film surface (A) instead of the coating composition used in Examples 1 to 3. The properties of the resulting biaxially oriented polyethylene terephthalate films and thin metallic film-bearing magnetic recording tapes are shown in Table 2.

Coating composition

The coating composition was prepared as a coating solution having a solids concentration of 2% by weight by diluting 28 parts by weight (as non-volatile component) of an aqueous dispersion of polyurethane containing a carboxylic acid amine salt group (Merci 585 made by Toyo Polymer Co., Ltd.), 28 parts by weight of an acrylic resin emulsion [methyl methacrylate/ethyl acrylate/acrylamide=49/43/8 (mole %)), 7 parts by weight of a polyethylene wax emulsion (mp. about 105° C.), 27 parts by weight of an aqueous dispersion of colloidal silica having an average particle diameter of 40 to 50 micrometers and 10 parts by weight of polyoxyethylene nonyl phenyl ether (NS-208.5 made by Nippon Oils and Fats Co., Ltd.).

TABLE 2

|  |  | Example | | |
|---|---|---|---|---|
|  |  | 4 | 5 | 6 |
| Inert solid particles | Type | Kaolin | Silica | Silica |
|  | Average particle diameter (micrometers) | 0.1 | 0.05 | 0.08 |
|  | Content of particles having a particle size of at least 1 micrometers (%) | 2 | 1 | 1.5 |

TABLE 2-continued

|  |  | Example | | |
|---|---|---|---|---|
|  |  | 4 | 5 | 6 |
| Amount added (wt. %) |  | 0.05 | 0.05 | 0.01 |
| Amount of coating on surface (B) as solids (mg/m$^2$) |  | 12.6 | 12.6 | 12.6 |
| Amount of coating on surface (A) as solids (mg/m$^2$) |  | 1.5 | 2.0 | 2.5 |
| Young's modulus in the longitudial direction (kg/mm$^2$) |  | 550 | 560 | 555 |
| Heat shrinkage in the transverse direction (%), 150° C. 30 min. |  | 3.5 | 3.6 | 3.5 |
| Film surface (A) | Large protrusions | Diameter (micrometers) | 0.7 | 1.0 | 0.7 |
|  |  | Height (angstrom) | 100 | 180 | 50 |
|  |  | Density (per mm$^2$) | $2 \times 10^4$ | $5 \times 10^4$ | $5 \times 10^4$ |
|  | Small protrusions | Diameter (micrometers) | 0.05 | 0.06 | 0.07 |
|  |  | Height (angstrom) | 30 | 50 | 50 |
|  |  | Density (per mm$^2$) | $2 \times 10^8$ | $4 \times 10^8$ | $5 \times 10^8$ |
| Film surface (B) | Ra (micrometers) |  | 0.006 | 0.007 | 0.008 |
|  | Rz (micrometers) |  | 0.055 | 0.067 | 0.075 |
| Height of protrusions on film surface (B) (angstrom) |  |  | 170 | 150 | 150 |
| Magnetic tape properties | S/N (db) 10KBPI |  | 49 | 45 | 45 |
|  | Output (10KBPI)/Output (50KBPI) |  | 4 | 5 | 5 |
|  | μk |  | 0.07 | 0.09 | 0.09 |
|  | Abrasion resistance |  | Good | Good | Good |

EXAMPLES 7-9

The same polymer as used in Example 3 was formed into an unstretched film and stretched under the conditions shown in Table 3 (where there is no indication in Table 3, the conditions were the same as in Example 3) to form an oriented film having a thickness of 10 micrometers. During the film formation, a coating composition having the same formulation as in Example 3 was coated on the film surfaces (A) and (B) under the same conditions as in Example 3.

A thin film of a cobalt-nickel alloy was formed in a thickness of 1,000 angstrom by vacuum deposition on the surface (A) of the polyester film. The film was then slit in the machine direction of the film to a width of ¼" to form a thin metallic film-bearing magnetic recording tape. Signals were recorded and played back at a speed of 9.5 cm/sec on the resulting tape using a ring head with a gap length of 0.3 micrometer, and the electromagnetic conversion characteristics (degital recording density characteristics) of the tape were evaluated. The results are shown in Table 3.

The durability of the tape at the time of repeated travelling was evaluated. Using the device shown in FIG. 1, the tape was repeatedly caused to travel through 50 cycles, and the damage of the edge of the tape was evaluated on the following standards.

Excellent: Hardly any damage
Good: Some damage but not deterimental to practical use
Poor: Marked damage The results are also shown in Table 3.

TABLE 3

|  |  | Example | | |
|---|---|---|---|---|
|  |  | 7 | 8 | 9 |
| Film- | Longitudinal stretch | 4.2 | 4.7 | 4.8 |

TABLE 3-continued

| | | Example | | |
|---|---|---|---|---|
| | | 7 | 8 | 9 |
| forming conditions | ratio Transverse stretch ratio | 3.6 | 3.6 | 3.5 |
| | Heat-setting temperature (°C.) | 200 | 180 | 210 |
| Young's modulus in the longitudial direction (kg/mm$^2$) | | 650 | 750 | 800 |
| Heat shrinkage in the transverse direction (%), 150° C. 30 min. | | 3.5 | 3.0 | 2.5 |
| Film surface (A) | Large protrusions Diameter (micrometers) | 0.8 | 0.8 | 0.7 |
| | Height (angstrom) | 50 | 50 | 50 |
| | Density (per mm$^2$) | $6 \times 10^4$ | $5 \times 10^4$ | $5 \times 10^4$ |
| | Small protrusions Diameter (micrometers) | 0.08 | 0.07 | 0.08 |
| | Height (angstrom) | 100 | 70 | 80 |
| | Density (per mm$^2$) | $7 \times 10^7$ | $1 \times 10^8$ | $1 \times 10^8$ |
| Film surface (B) | Ra (micrometers) | 0.006 | 0.007 | 0.008 |
| | Rz (micrometers) | 0.055 | 0.067 | 0.078 |
| Magnetic tape properties | S/N (db) 10KBPI | 45 | 47 | 48 |
| | Output (10KBPI)/Output (50KBPI) | 5 | 4 | 3 |
| | Durability in repeated travelling | Excellent | Excellent | Excellent |
| | Abrasion resistance | Good | Good | Good |

What is claimed is:

1. A biaxially oriented polyester film for use in thin metallic film-type magnetic recording media, said polyester film having a first surface to which a thin metallic film as a magnetic recording layer is to be applied and a second surface coated with an easily slippable layer composed of an organic polymeric binder and inert fine solid particles dispersed therein, the first surface having (a) large protrusions with a diameter of 0.2 to 2 micrometers and a height of 20 to 200 angstrom distributed at a density of at least $10^3$ but less than $10^6$ per mm$^2$, and (b) small protrusions with a diameter of 0.01 to 0.1 micrometer and a height of 10 to 100 angstrom distributed at a density of from $10^6$ up to $10^9$ per mm$^2$.

2. The film of claim 1 wherein the large protrusions have a diameter of 0.5 to 2 micrometers and a height of 50 to 200 angstrom and are distributed at a density of $10^4$ to $10^5$ per mm$^2$.

3. The film of claim 1 wherein the small protrusions have a diameter of 0.05 to 0.1 micrometer and a height of 10 to 100 angstrom distributed at a density of $10^7$ to $10^8$ per mm$^2$.

4. The film of claim 1 wherein the large protrusions are given by inert solid fine particles having an average particle diameter of 0.05 to 0.5 micrometer dispersed in the film.

5. The film of claim 1 wherein the small protrusions are formed by coating the first surface with a coating composition comprising inert solid fine particles having an average particle diameter of 0.01 to 0.1 micrometer and an organic polymeric binder.

6. The film of claim 1 wherein the easily slippable layer on the second surface has a surface roughness represented by its center line average roughness Ra of 0.002 to 0.01 micrometer and its 10-point average roughness Rz of 0.01 to 0.1 micrometer.

7. The film of claim 1 wherein the easily slippable layer on the second surface has a surface with network-like fine protrusions having a height of 200 to 600 angstrom.

8. The film of claim 1 which has a Young's modulus in the longitudinal direction of at least 550 kg/mm$^2$ and a heat shrinkage in the transverse direction of 1 to 5%.

9. A magnetic recording medium composed of the polyester film of claim 1 and a ferromagnetic thin metallic film applied to its first surface.

* * * * *